UNITED STATES PATENT OFFICE.

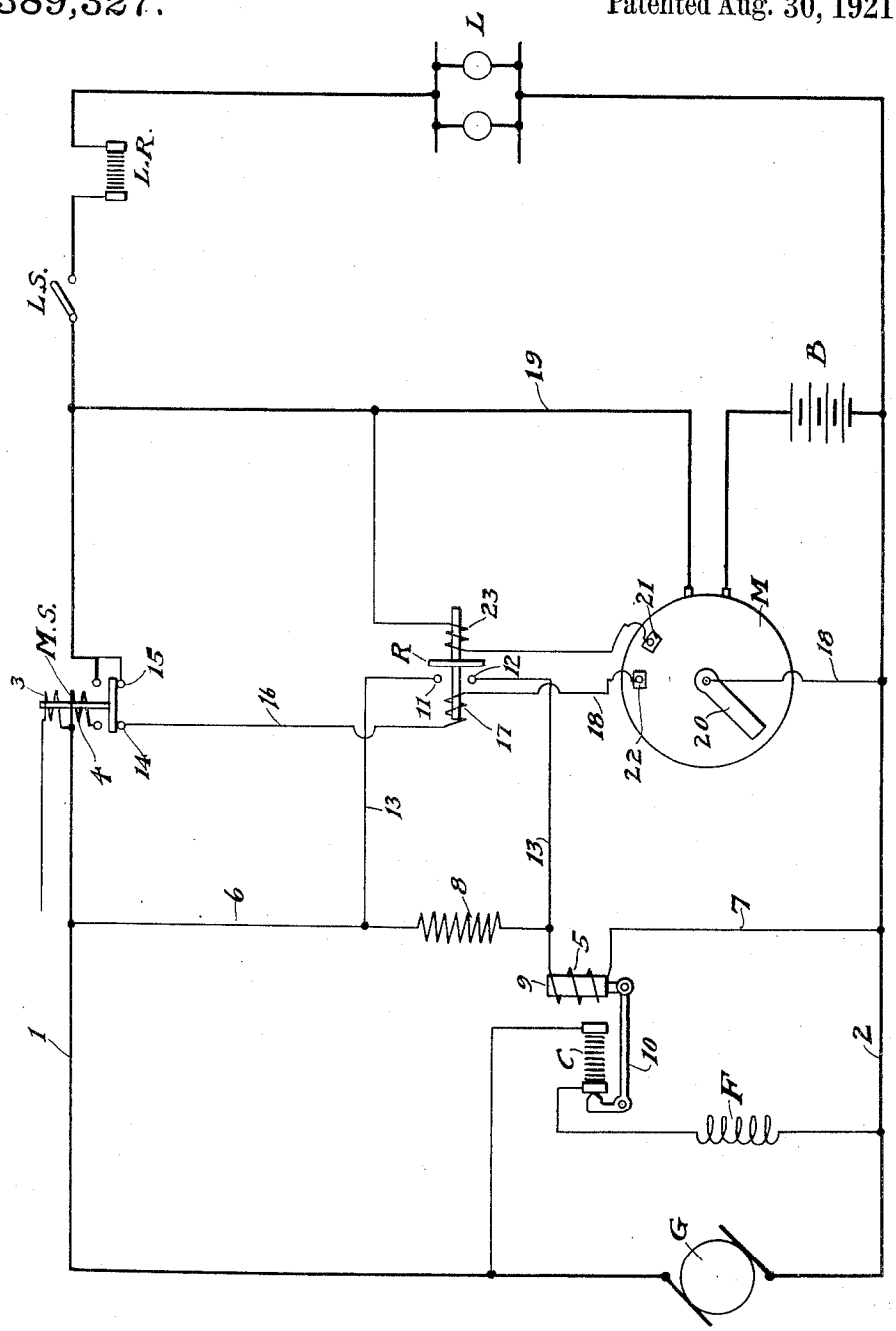

LEONARD A. WATSON, OF BROOKLYN, NEW YORK, ASSIGNOR TO THE SAFETY CAR HEATING AND LIGHTING COMPANY, OF NEW YORK, N. Y., A CORPORATION OF NEW JERSEY.

SYSTEM OF ELECTRICAL DISTRIBUTION.

1,389,327.   Specification of Letters Patent.   Patented Aug. 30, 1921.

Application filed September 19, 1919. Serial No. 325,001.

*To all whom it may concern:*

Be it known that I, LEONARD A. WATSON, a citizen of the United States, residing at Brooklyn, in the county of Kings and State of New York, have invented certain new and useful Improvements in Systems of Electrical Distribution, of which the following is a full, clear, and exact description, such as will enable others skilled in the art to which it appertains to make and use the same.

This invention relates to systems of electrical distribution, and is more particularly directed to an improved car lighting system including a variable speed generator and a battery adapted for connection to be charged thereby and lamps adapted for connection to be supplied by the generator or by the battery, and to improved means of electrical regulation therefor.

It is an object of the invention to provide a reliable regulating apparatus for a system of the character mentioned, whereby a relatively rapid charging of the battery may be effected without the liability of a long-continued and injurious battery overcharging.

It is a further object to provide an improved system including a variable speed generator with a regulator and an electro-responsive controller therefor possessing features of structural superiority and functional advantage.

Other objects and advantages will be in part noted hereinafter in connection with the following description of the accompanying drawing, which illustrates an exemplary embodiment of the invention and in which the figure represents a simplified wiring diagram of one form of car lighting system.

Referring more particularly to the drawing, there is indicated a generator G adapted to be driven from a car axle at variable speeds and having a shunt field winding F, which latter is provided with a variable resistance, such as a carbon pile C, in series therewith. The generator is adapted for connection by main lines 1 and 2 with a battery B to be charged thereby and lamps L to be supplied by the generator or by the battery, under certain conditions. An automatic main switch MS is provided in the line 1 between the generator and battery and may be controlled, in a well understood manner, by the joint action of a voltage coil 3 and a current coil 4 so designed as to close the circuit of the line 1 when the voltage of the generator equals or exceeds a predetermined value, and to open said circuit when the generator voltage decreases below a predetermined value. The normal action of the main switch is to connect the generator with the battery and the lamps, if on, when the speed of the train (or the driven speed of the generator) is above a predetermined rate and to disconnect the generator from the translating devices when the train is below a predetermined speed, during, for example, a deceleration for stopping and a limited acceleration thereafter. A lamp switch LS may be provided in the circuit to the lamps, and of course the individual lamps may also be provided with separate switches, as desired. A lamp regulator LR of suitable construction and well known function may be provided to control the voltage applied on the lamps.

As shown in the drawing, the regulator for the generator includes a voltage responsive coil 5 connected across the lines 1 and 2 by leads 6, 7, and having an element of resistance 8 which, under certain conditions, and preferably during the period of battery charging, is in series with the regulating coil. Coil 5 constitutes the winding for a movable core 9 connected to a lever 10, which latter acts to vary the degree of compression of the carbon pile C and thereby the strength of the generator field F. In operation, the regulating parts described act to weaken the generator field upon increase of generator voltage, and to strengthen the field upon decrease of generator voltage, whereby the tendency of the regulator is to maintain constancy of a function of the generator output in spite of train speed changes (and consequent changes in the driven speed of the generator) which would otherwise result in excessive fluctuations of the generator voltage. In the form illustrated, the coil 5 tends to maintain constancy of generator voltage as against, also, changes in the counter E. M. F. or state of charge of the battery and changes in lamp load, and this operation may be continued during a major period of battery charging.

In order to expedite the time required to charge the battery, the coil 5 may be designed to maintain, if desired, a relatively high generator voltage, and automatic means is associated in the system to prevent a long-continued maintenance of such voltage after the battery has been substantially charged. To effect the latter purpose there is provided a relay R controllable by a means responsive to generator voltage under certain conditions to close the circuit across contacts 11, 12 in a shunt 13 about the resistance 8. As illustrated, the automatic means referred to, responsive to generator voltage for controlling the relay R, comprises the main switch MS in the line 1, this switch being adapted, upon opening, to close a break across contacts 14, 15 of the lead 16 of a relay closing coil 17, the other lead, 18, of the latter being connected under predetermined conditions to be opposite main line 2.

An ampere hour meter M may be connected in the battery branch 19 to register and indicate the relative state of charge of the battery B, and the meter may have an indicating pointer 20 as a movable contact, connected to the line 2, rotatable counter-clockwise on charge to engage a relatively fixed contact 21, and later, a terminal contact 22, the latter preferably being positioned to be engaged by the contact 20 after the battery charge has been substantially completed. A relay opening coil 23 may be provided for connection across the battery under certain conditions, as will be described.

The functional working of the parts referred to hereinabove may be briefly explained as follows: Assuming the battery to be only partially charged and the train at rest, the relay 4 is open, the main switch MS is open, and the regulator, including coil 5 with the resistance 8 in series, is set to maintain relatively high voltage during the succeeding period of its regulating effectiveness. This condition normally recurs at each train stop or predetermined generator voltage diminishment, prior to the substantial completion of battery charging. When the train re-starts and accelerates, or when the voltage of the generator re-builds in excess of a predetermined value, the main switch MS closes the break in line 1, and the regulation of the generator is taken up by coil 5 continuing to maintain constancy of generator voltage at the pre-selected and relatively high value. Charging current consequently is supplied in the battery B and the lamp load, if any, also carried by the generator. The meter contact 20, as the charge increases, first engages contact 21 to energize relay opening coil 23. The relay, however, is of a character tending to maintain its instant position, and, already being open, is consequently unaffected. Contact 20 thence passes off contact 21 and engages contact 22, completing the break in the lead 18 of coil 17. Still, however, the relay is unaffected on account of the break in lead 16 across contacts 14 and 15 governed by the generator voltage responsive means, indicated herein as the main switch MS. The regulation of the generator consequently continues unaffected and the taper charge to the battery continues. At the next succeeding train stop (or opening of the main switch MS or diminishment of the generator voltage below the preselected value governing the voltage responsive controller for the relay) circuit is made across the contacts 14 and 15 and coil 17 thereby energized to actuate relay R for closing the break across contacts 11 and 12 and thereby short-circuiting the resistance 8. In the drawing, it will be observed that the short-circuiting of the resistance 8 described, that is, the re-setting of the generator regulator, occurs at a time of regulating ineffectiveness of the regulator, to wit, while the main switch MS has interrupted continuity of line 1. And it will be further observed that the action of relay R to set the generator regulator is under the control of the main switch (responsive to generator voltage), operating at an uncertain interval next succeeding an assumed state of battery charge, as indicated by the meter M. When the train next re-starts and the generator voltage re-builds, the main switch MS re-closes the break in line 1 and the regulator coil 5, relatively strengthened by the short circuit about resistance 8, becomes effective to maintain relative constancy of generator voltage at a predetermined relatively low value, so that, on account of the counter E. M. F. of the battery, further continued over-charging of the latter is prevented. It may be mentioned that the relatively slight overcharge of the battery, as may be effected by the system herein described, is of advantage.

Assuming a long-continued train stop or other condition in which, for example, by a lamp load supplied by the battery, the battery charge decreases, the meter contact 20, on reverse rotation, reëngages contact 21 and energizes coil 23 to open the relay R and thereby reinsert resistance 8 in series with coil 5. This action, it will also be observed, occurs during an interval of regulating ineffectiveness of the coil 5, that is, while the generator voltage is too low for a useful current and the line 1 consequently broken through the main switch.

It is to be understood that certain features of the invention as hereinabove set forth are susceptible of modification and are capable of combination with systems having generator regulators of various forms, and that such modifications and combinations may be effected without sacrifice of the functional advantages of the present invention and without departing from the scope of the appended claims, Having described my invention, what I claim as new and desire to secure by Letters Patent is:

1. In a system of the character described, in combination, a variable speed generator, a battery adapted for connection to be charged thereby, electro-responsive means effective to regulate a function of the generator output as against speed changes while the generator voltage exceeds a predetermined value, and automatic means responsive to generator voltage and operable only under certain conditions at an interval of regulating ineffectiveness of said electro-responsive means to alter the standard of succeeding effectiveness of the latter.

2. In a system of the character described, in combination, a variable speed generator, a battery adapted for connection to be charged thereby, electro-responsive means to regulate the generator voltage during the times of closed circuit connection between the battery and the generator, and automatic means operable to affect said electro-responsive means but only at an interval of regulating ineffectiveness of the latter succeeding a major charge to said battery.

3. In a system of the character described, in combination, a variable speed generator, a battery adapted for connection to be charged thereby, electro-responsive means to regulate the generator voltage during the times of closed circuit connection between the battery and the generator, and automatic means operable to affect said electro-responsive means but only at an interval of regulating ineffectiveness of the latter next succeeding a major charge to said battery.

4. In a system of the character described, in combination, a variable speed generator, a battery adapted for connection to be charged thereby, electro-responsive means to regulate said generator and tending to maintain constancy of generator voltage in spite of speed changes and in spite of changes in the state of battery charge, and automatic means operable only when the generator voltage diminishes below a predetermined value to set said electro-responsive means for controlling the generator voltage at another value when the generator voltage again exceeds said predetermined value.

5. In a system of the character described, in combination, a variable speed generator, a battery adapted for connection to be charged thereby, electro-responsive means including a voltage responsive coil tending to maintain constancy of generator voltage at a relatively high value in spite of speed changes and in spite of changes in the state of battery charge, and automatic means including a device responsive to generator voltage and operable only when said voltage is less than a predetermined relatively low value to set said electro-responsive means to maintain the generator voltage at an intermediate value when the generator voltage again exceeds said predetermined relatively low value.

6. In a system of the character described, in combination, a variable speed generator, a storage battery adapted for connection to be charged thereby, electro-responsive means for regulating the generator, and electro-responsive means influenced by the generator voltage and effective upon a predetermined decrease of such voltage succeeding a substantial completion of battery charging to lower the standard of regulation thereafter to be effected by said first-mentioned means.

7. In a system of the character described, in combination, a variable speed generator, a storage battery adapted for connection to be charged thereby, electro-responsive means for regulating said generator, and electro-responsive means influenced by the generator voltage and effective upon a predetermined decrease of such voltage next succeeding a substantial completion of battery charging to lower the standard of regulation thereafter to be effected by said first-mentioned means.

8. In a system of the character described, in combination, a variable speed generator, a battery adapted for connection to be charged thereby, an automatic switch to complete the circuit between said generator and said battery while the generator voltage exceeds a predetermined value and to open the circuit therebetween while the generator voltage is less than a predetermined value, electro-responsive regulating means for the generator effective to limit the generator voltage during the periods of closure of said switch, and means to vary the setting of said regulating means operable by said automatic switch in opening to lower the limit of generator voltage to be established by said regulating means after reclosure of said automatic switch.

9. In a system of the character described, in combination, a variable speed generator, a battery adapted for connection to be charged thereby, an automatic switch to complete the circuit between said generator and said battery while the generator voltage exceeds a predetermined value and to open the circuit therebetween while the generator voltage is less than a predetermined value, electro-responsive regulating means for the generator effective to limit the generator voltage during the periods of closure of said switch, and means to vary the setting of said regulating means operable by said automatic switch in opening only under certain conditions to lower the limit of generator voltage to be established by said regulating means after reclosure of said automatic switch.

10. In a system of the character described, in combination, a variable speed generator, a battery adapted for connection to be charged thereby, an automatic switch adapted to operate upon a diminishment of the generator voltage to a predetermined value, regulating means to control the output of said generator as against speed changes while the generator voltage exceeds a predetermined value, and means controlled by said switch in acting responsive to said diminishment of generator voltage under certain conditions of the battery charge to govern the action of said regulating means succeeding the rebuilding of the generator voltage above said second-mentioned predetermined value.

11. In a system of the character described, in combination, an axle driven variable speed generator, a storage battery adapted for connection to be charged thereby, a regulator operable to maintain relative constancy of generator voltage in spite of speed changes during the times of closed circuit from said generator to said battery, means responsive to the battery charging current and indicative of the relative state of battery charge, means to vary the value of relative constancy of generator voltage maintained by said regulator, and electro-responsive means operable during a period of open circuit between said generator and said battery to control said action of said second-mentioned means but only after the relative completion of battery charging as indicated by said first-mentioned means.

12. In a system of the character described, in combination, a variable speed generator, a battery adapted for connection to be charged thereby, a regulator operable to maintain relative constancy of generator voltage in spite of speed changes during the times of closed circuit from said generator to said battery, means responsive to the battery charging current and indicative of the relative state of battery charge, automatic means to vary the value of relative constancy of generator voltage maintained by said regulator, and electro-responsive means to control the said action of said automatic means, the controlling effectiveness of said electro-responsive means being subject to said first-mentioned means.

13. In a car lighting system, in combination, a variable speed generator having a shunt field winding, a battery adapted for connection to be charged thereby, a regulator for said generator including an electro-responsive coil acting to maintain relative constancy of generator voltage in spite of speed changes and changes in the state of battery charge, a resistance in series with said coil, a relay operable under certain conditions to decrease the effectiveness of said resistance, and automatic means responsive to generator voltage and operable upon a predetermined diminishment of such voltage next succeeding the relative completion of battery charging to actuate said relay.

14. In a car lighting system, in combination, a variable speed generator, a battery adapted for connection to be charged thereby, an automatic main switch to disconnect the battery from the generator upon a predetermined diminishment of generator voltage, a regulator for the generator acting when effective to maintain relative constancy of generator voltage as against speed changes and as against changes in the state of battery charge, a governing resistance for said regulator, and a relay controlling said resistance to decrease the effect thereof at a period of ineffectiveness of said regulator and controlled for such purpose by said main switch.

In testimony whereof I affix my signature, in the presence of two witnesses.

LEONARD A. WATSON.

Witnesses:
 HELEN M. SEAMANS,
 DAVID A. WOODCOCK.